United States Patent [19]
Derrien et al.

[11] 3,770,619
[45] Nov. 6, 1973

[54] PROCESS FOR HYDROCARBON PURIFICATION BY SELECTIVE HYDROGENATION

[75] Inventors: Michel Derrien, Rueil Malmaison; Hugo Van Landeghem, Vienne; Pierre Jeanjean, Meudon La Foret; Jean Francois LePage, Rueil Malmaison, all of France

[73] Assignee: Institut Francais du Petrole des Carburants et Lubrifiants, Rueil-Malmaison, France

[22] Filed: Feb. 16, 1971

[21] Appl. No.: 115,853

[30] Foreign Application Priority Data
Feb. 23, 1970 France .............................. 7006456

[52] U.S. Cl. .............. 208/255, 208/143, 260/677 H
[51] Int. Cl. ......................... C07c 7/00, C07c 11/24
[58] Field of Search .......................... 208/255, 143; 260/677 H, 681.5

[56] References Cited
UNITED STATES PATENTS

| | | | |
|---|---|---|---|
| 3,167,498 | 1/1965 | Krönig et al. ........................ | 208/143 |
| 3,124,526 | 3/1964 | Butler et al. ........................ | 208/255 |
| 3,493,492 | 2/1970 | Sze ...................................... | 208/255 |
| 3,457,163 | 7/1969 | Parker ................................ | 208/255 |
| 3,537,982 | 11/1970 | Parker ................................ | 208/255 |
| 2,927,141 | 3/1960 | Cohn et al. ........................ | 260/677 |

FOREIGN PATENTS OR APPLICATIONS
14,417   6/1962   Japan

*Primary Examiner*—Delbert E. Gantz
*Assistant Examiner*—Juanita M. Nelson
*Attorney*—Millen, Raptes & White

[57] ABSTRACT

Process for purification of a hydrocarbon mixture by selective hydrogenation of the highly unsaturated compounds contained therein, comprising a first stage of passing the mixture in the liquid phase with a hydrogenating gas through a fixed bed hydrogenation catalyst at a temperature between −10° and 180°C and under a relatively small pressure allowing vaporization of from 5 to 50 percent b.w. of the mixture and condensing the vaporized fraction, and a second stage of passing the resulting mixture with a hydrogenating gas through a fixed bed hydrogenation catalyst at a temperature between 0° and 120°C under a higher pressure than in the first stage, at which the mixture is in the liquid phase.

20 Claims, No Drawings

PROCESS FOR HYDROCARBON PURIFICATION BY SELECTIVE HYDROGENATION

The present invention relates to a new process for purification of hydrocarbon mixtures. This process consists of a selective hydrogenation of highly unsaturated hydrocarbons contained in these mixtures. The process according to the invention may be used, with a modification of the operating conditions, for purifying olefinic hydrocarbons having three or four carbon atoms per molecule, as well as gasolines which, when obtained by pyrolysis, contain heavier hydrocarbons.

In the following description, the term highly unsaturated compounds is used to designate the hydrocarbons to be selectively hydrogenated, contained in mixtures; these hydrocarbons will be obviously different according to the type of charge (gasolines or $C_3$—$C_4$ cuts).

From the following, the meaning in each case of "highly unsaturated compounds" will be apparent.

Propylene, butene and butadiene cuts obtained from various pyrolysis processes, particularly pyrolysis in the presence of steam, contain as impurities a number of highly unsaturated hydrocarbons which must be removed in order that said cuts comply with the specifications required for further usages. Among said impurities are the acetylenic compounds and some dienic compounds. Among the acetylenics are to be mentioned : acetylene, methylacetylene, vinylace-tylene and diacetylene and, among the dienic compounds : propadiene and 1,2-butadiene.

The gasolines obtained by pyrolysis, which essentially consist of hydrocarbons containing from five to 10 carbon atoms per molecule, contain as impurities, unsaturated hydrocarbons which are to be removed in order to make possible the use of these gasolines as motor fuels.

Among these impurities, there will be mentioned particularly the diolefines and the alkenylaromatics. In the case of gasolines, these compounds are generally defined as highly unsaturated compounds.

The highly unsaturated compounds may be removed by selective operations, such as, the formation of complexes with silver or copper salts, condensation of acetylenics with one another or with dienes of the feed, and more generally by selective hydrogenation. The selective hydrogenation of these highly unsaturated compounds may be carried out either in the gaseous phase or in the liquid phase, but in both cases, some difficulties are encountered relating on the one hand to the selectivity of the conversion and on the other hand to the removal of the heat developed by the hydrogenation. It has to be noted, in fact, that the fixation of each hydrogen gram-molecule corresponds to a heat liberation of 27 to 35 kilocalories. It was accordingly necessary, up to now, to cool down the reaction mixture, by various means, so as to avoid a substantial temperature increase of the same.

A process has now been discovered which obviates these drawbacks, and this is one of the objects of the present invention. The essential feature of the process of the invention is the use of two separate and successive reaction zones. The main feature of the first reaction zone is a moderate temperature increase of the reaction medium. In the second reaction zone, it consists of maintaining the reacting hydrocarbons practically in the liquid state during the hydrogenation stage; in these conditions, the hydrogen may be considered as completely dissolved.

A first advantage of this two-stage process is that, in each reaction zone where a hydrogenation catalyst is used, the latter may be used according to the conventional fixed bed technique under simple conditions, i.e., without heat exchange equipment within the catalyst bed, which makes the engineering thereof easier.

A second advantage of the process according to the invention is its flexibility, in each of the reaction zones, with respect to the various operating conditions, for example : pressure, temperature, space velocity and the catalysts used; thus the process may conform to the special nature of the feed subjected to the treatment and of the desired products. This flexibility allows a surprising selectivity in each particular case.

It will be possible, by applying the process to gasolines, to obtain, with slight modifications of the operating conditions, a more complete hydrogenation of the feed comprising also a partial hydrogenation of the olefins.

The process according to the invention is a process for purifying hydrocarbon mixtures (hydrocarbons which may contain from three to 10 carbon atoms per molecule) by selective hydrogenation, said mixtures containing as impurities highly unsaturated compounds, such as defined above, wherein the hydrocarbon mixture is passed, in the liquid phase, with a hydrogenating gas, through a first reaction zone containing a fixed bed hydrogenation catalyst, at a temperature of from −10°C to +180°C, under a moderate pressure making possible the vaporization under the action of the heat developed by the hydrogenation, of a fraction of from 5 to 50 percent by weight of the supplied hydrocarbon mixture, thus avoiding a substantial temperature increase of the reaction mixture, the vaporized fraction is condensed and the resulting hydrocarbon mixture from the first stage is passed, in the liquid phase, with a hydrogenating gas, through a second reaction zone containing a fixed bed hydrogenation catalyst, at a temperature of from 0° to 120°C and under a higher pressure than in the first stage, which is sufficient for maintaining the mixture of the reactants practically in the liquid phase during the hydrogenation.

The used hydrogenating gas, which may contain, in addition to hydrogen, light hydrocarbons having one or two carbon atoms per molecule such as methane or ethane, preferably contains more than 60 percent of hydrogen by volume.

In another embodiment of the above process, it is possible to recycle, after condensation and before passage through the second reaction zone, a portion of the feed to the first reaction zone. The recycling provides an improvement in the selectivity of the hydrogenation. The recycling rate will vary according to the feed composition; as a matter of fact it is preferred, in order to avoid excessive heat liberation, and consequently too high a temperature increase in the second reaction zone, to feed said latter zone only with a charge containing a maximum of 5,000 ppm by weight of highly unsaturated compounds. The recycling rate is defined as the ratio of the recycled fraction to the fresh fraction in the charge supplied to the first reaction zone, consisting of a mixture of fresh and recycled charge. The charge supplied to the second reaction zone must have an impurities content lower than 5 000 ppm b.w., so as to obtain a final product with the desired purity. The purity degree of the product or the maximum content of undesirable compounds therein, is variable according to the treated charges. The recycling rate will therefore be adjusted so that, after the admixture of the recycled fraction with the fresh charge, the content of highly unsaturated compounds is from 0.5 to 3 percent, and preferably from 1 to 2 percent by weight.

The first reaction zone is fed with a liquid charge, the impurities content of which has been defined above, and with a hydrogenating gas. The charge is preferably brought to the reaction temperature of the first zone. The liquid charge and the hydrogenating gas are admixed before passing through the catalyst bed. The temperature selected for the reaction is such that the major part of the heat produced by the reaction is used to vaporize a fraction of the charge hydrocarbons; this avoids a high temperature increase in the reaction zone. It is advantageous that the temperature rise be not higher than 20°C and more advantageously be lower than 10°C.

There will be described, hereinafter, the operating conditions of the process as applied to charges containing three or four carbon atoms per molecule.

In the first reaction zone, the temperature selected for the hydrogenation, which is mainly dependent on the exact composition of the charge, may be advantageously from −10° to +50°C and preferably from 10° to 30°C. The pressure for the treatment of $C_3$ cuts is advantageously between 10 and 30 bars and for $C_4$ cuts between 5 and 15 bars. The amount of hydrogen introduced, per time unit, is from 0.8 to 1.5 times and preferably from 1 to 1.2 times the theoretical amount required for selectively hydrogenating the highly unsaturated compounds. This ratio will be called hereinafter m. The space velocities (V.V.H) expressed in liters of liquid charge to be hydrogenated per liter of catalyst per hour, will be advantageously in the range of from 5 to 100 and preferably from 20 to 80. A more precise description of the composition and the type of the catalyst bed will be given herebelow.

At the outlet from the first reaction zone, the vaporized fraction of the charge, which fraction is from 5 to 50 percent by weight, is then condensed.

After the condensation the liquid charge is separated from a gaseous fraction consisting essentially of unreacted hydrogen and hydrocarbons containing one or two carbon atoms per molecule, optionally accompanying the hydrogenating gas.

The liquid fraction, issued from the first reaction zone and whose content of highly unsaturated compounds is lower than 5,000 ppm by weight, whether or not recycling has been carried out, is sent with a hydrogenating gas into a second reaction zone under a sufficiently high pressure for maintaining substantially all hydrocarbons in a liquid state in spite of the heat developed by the reaction. The pressure has a value depending mainly on the nature of the charge, for example from 15 to 40 bars and preferably from 20 to 30 bars. It must be reminded that, in the second reaction zone, the reacting compounds remain in the liquid state during all the reaction time. The temperature at the inlet of said zone is advantageously selected from 0° to 30°C and preferably from 10° to 20°C. The ratio of the amount of the introduced hydrogen to the amount of hydrogen theoretically necessary for the selective hydrogenation of all the highly unsaturated compounds (m) is preferably in the range of from 1 to 3 according to the desired purity degree. The space velocity (V.V.H), expressed in liters of charge per liter of catalyst and per hour, will be advantageously from 5 to 150 and preferably from 20 to 80. A detailed description of the catalyst bed will be given herebelow. It must be noted that there are two different ways of carrying out this process. As a matter of fact, for increasing the hydrogenation selectivity, it is possible, in the second reaction zone, to use two catalyst beds whose respective contents of active agent are clearly different, instead of a single one; this embodiment will be particularly advantageous when hydrogenation is performed in the presence of diolefines, for example when hydrogenating acetylenic hydrocarbons and 1,2-butadiene contained in 1,3-butadiene.

The catalysts used in the different phases of the process are selected among the metals from group VIII of the periodic classification of elements, such as for example nickel, cobalt, platinum or palladium.

There will be used preferably nickel or palladium in the process according to the invention. These catalysts may be deposited on inert carriers having a sufficiently low acidity to be highly selective. Among these carriers, inert alumina may be used to manufacture the catalyst referred to hereinafter. The finished catalyst, comprising a catalytic element on a carrier, has advantageously a surface of from 1 to 100 m²/g and preferably from 50 to 100 m²/g and a total porous volume of from 0.3 to 1 cc/g. The surface acidity of the catalyst, measured by adsorption of ammonia at 320°C under a pressure of 300 mm of said gas is characterized by the fact that the heat developed by this adsorption is preferably lower than 4 calories/g of catalyst, which makes it possible to avoid parasitic polymerizations and the subsequent clogging of the catalyst. Among the other carriers, silica, particularly the neutral type, may be selected; the surface of the catalyst may then be in the range of from 1 to 300 m²/g.

The palladium catalysts generally contain from 0.01 to 1 percent by weight of this metal. The nickel catalysts generally contain from 1 to 20 percent by weight of this metal. The catalyst may be used in the form of balls, crushed particles, pills or extrudates having an average grain size which may range from 1 to 6 mm and preferably from 2.5 to 4 mm in order to exhibit a good mechanical strength.

In the process according to the invention, the catalyst is used according to the fixed bed technique, the catalyst bed having, according to the type of charge and the content of impurities, a ratio of its height to its diameter from 1 to 8 and preferably from 2 to 5. The catalysts used in each of the two reaction zones may differ particularly with respect of the relative amounts of catalytic metals deposited on the carriers. These differences may be explained by the fact that the amount of charge to be hydrogenated is considerably lower in the second reaction zone than in the first one.

In the first reaction zone, the catalyst, for example palladium or alumina, has advantageously a palladium content of from 0.2 to 0.8 percent by weight.

The catalyst used in the second reaction zone, when consisting of palladium on alumina, generally contains from 0.05 to 0.4 percent and preferably from 0.1 to 0.3 percent by weight of palladium.

When the second reaction zone contains, in another embodiment of the process, two catalyst beds, they may be substantially different with respect to the relative amounts of carrier and catalyst metal. The use of these two catalyst beds provides for an improvement in the hydrogenation selectivity. In such a case, the second catalyst bed may consist of palladium or alumina and then contains from 0.02 to 0.2 percent and preferably from 0.05 to 0.1 percent by weight of palladium.

A similar process is used for the purification of pyrolysis gasolines consisting essentially of hydrocarbons having from five to 10 carbon atoms per molecule. It is used for the selective hydrogenation of diolefines and alkenyl aromatics, and may also be used for a more complete hydrogenation of the charge, including a partial hydrogenation of the olefines.

In the process as used for the treatment of pyrolysis gasolines, the usual operating temperatures, which are not very different in each of the two reaction zones, will be in the range of from 20° to 180°C and advantageously from 60° to 120°C. The pressures used in the first reaction zone are from 5 to 50 and preferably from 15 to 35 bars; in the second reaction zone, the pressures are from 30 to 80 and preferably from 35 to 60 bars. The above-mentioned temperatures depend on the charge which is subjected to hydrogenation, and in particular on the sulfur content of said charge and on the carbon monoxide content of the hydrogenating gas. The catalysts used in the selective hydrogenation of the pyrolysis gasolines are the same as those used in hydrogenation of $C_3$ and $C_4$ cuts. The ratio $m$, of the supplied amount of hydrogen to the theoretical amount required for hydrogenating the undesirable compounds is generally from 1 to 10, and preferably from 2 to 7 for the first reation zone and from 2 to 12, preferably from 4 to 10 for the second reaction zone. The space velocities (V.V.H) expressed in liters of the charge to be hydrogenated per liter of catalyst and per hour are in the range of from 5 to 50 and preferably from 5 to 20.

The following examples, showing the selective hydrogenation of $C_3$ and $C_4$ cuts and of gasolines, are given by way of mere illustration and are not intended to limit in any way the scope of the invention.

TESTS

The tests have been carried out in a pilot unit in a tube which may contain 50 to 100 cc of catalyst. Gas flow regulators provide for adjustment to the desired values of the flow rates of hydrogenating gas at the inlet of the reactor; the hydrogen used contained 2 ppm of oxygen, 40 ppm of water and 27 percent of methane. The ratios $H_2/HC = m$ indicated in the examples correspond to the ratio of the hydrogen molar flow rate to the molar flow rates of the compounds to be removed.

In these tests, three catalysts pertaining to the above-mentioned series have been used.

Catalyst $K_1$ is a catalyst with a 0.5 percent palladium content, manufactured from palladium nitrate deposited on alumina with a 1 % $Na_2O$ content; it has a 60 $m^2/g$ specific surface and a porous volume of 0.6 cc/g. The catalyst is in the form of balls of a diameter between 2 and 3 mm. The impregnation of palladium is carried out in a slightly acid medium (pH 2 to 3), so as to impregnate palladium only on the external layer of the grains, the thickness of which is between 0.25 and 0.75 mm. After impregnation, the catalyst is roasted at 500°C, and then reduced in the reactor at a temperature of 100°C in a stream of pure hydrogen.

Catalyst $K_2$ has the same characteristics as catalyst $K_1$, except for its palladium content which is 0.2 percent; catalyst $K_3$ has the same characteristics as both preceding catalysts, except for its palladium content which is 0.1 percent.

EXAMPLE 1 a

Selective Hydrogenation of an Olefinic $C_3$ Cut
Operating Conditions

| First reactor | | Second reactor | |
|---|---|---|---|
| P | : 14 bars | P | : 27 bars |
| VVH | : 80 | VVH | : 50 |
| m | : 1.2 | m | : 2 |
| T | : 10°C | T | : 10°C |
| Recycling rate | : 1 | Recycling rate | : 0 |
| Catalyst | : $K_1$ | Catalyst | : $K_2$ |

| | molar composition of the charge | Molar composition of the intermediary product | Molar composition of the final product |
|---|---|---|---|
| $C_2H_4$ | 0.10 | 0.09 | 0.09 |
| $C_2H_6$ | 5.93 | 5.93 | 5.94 |
| $C_3H_6$ | 90.36 | 92.07 | 91.81 |
| $C_3H_8$ | 0.04 | 1.74 | 2.11 |
| $CH \equiv C-CH_3$ | 2.01 | 0.05 | 0.0007(7ppm) |
| $CH_2=C=CH_2$ | 1.50 | 0.07 | 0.0016(16ppm) |
| $C_4H_8$ | 0.04 | 0.04 | 0.04 |
| $C_4H_{10}$ | 0.01 | 0.01 | 0.01 |
| $C_5$ + in ppm | 100 | 225 | 350 |

There is obtained, in this case, an elimination of the impurities, the residue content thereof being 23 ppm; the figures of table 1 a are to be compared to those of table 1 b where the operation is carried out in several different ways. The first column of figures corresponds to the operation carried out in the first reactor exclusively, but at a spatial velocity of 31, i.e. at the space velocity used in the total unit of example 1 a; the recycling rate was 1 in that test, there were two catalysts beds, the first containing 40 g of $K_3$, the second 25 g of $K_1$. This comparison shows that not only from the point of view of the conversion rate but also with respect to the selectivity, it is of interest to make use of a system of two reactors as described in the invention.

The second column of figures corresponds to the embodiment 1 a but with a single catalyst $K_1$.

The third column of figures corresponds also to the embodiment 1 a but with the second reactor also operated at 14 bars instead of 27 bars.

The comparison shows the advantage of the process of the invention: the selectivity is better, i.e. for a given conversion of the acetylenics, the propylene loss (initial + potential) is smaller and the polymer content lower. Moreover, the conversion rate at a constant space velocity remains very high. Only test 1 $b_2$ gives conversions slightly better for methylacetylene and propadiene, but with a smaller selectivity.

The use of a low pressure in test 1 $b_3$ produces a gasous phase containing impurities, the contact of which with the catalyst is carried out imperfectly in presence of the liquid phase; the performances are not so good than in test 1 a, as well with respect to the purification rate as with respect to the selectivity (smaller propylene yields).

| | Molar composition of feed | Molar composition of products | | |
|---|---|---|---|---|
| | | 1 | 2 | 3 |
| $C_2H_4$ | 0.10 | 0.09 | 0.09 | 0.08 |
| $C_2H_6$ | 5.93 | 5.91 | 5.93 | 5.91 |
| $C_3H_6$ | 90.36 | 90.21 | 91.12 | 90.95 |
| $C_3H_8$ | 0.04 | 3.66 | 2.81 | 3.00 |
| $CH \equiv C-CH_3$ | 2.01 | 0.0040 | 0.0005 | 0.0013 |
| $CH_2=C=CH_2$ | 1.05 | 0.0073 | 0.0012 | 0.0030 |
| $C_4H_8$ | 0.04 | 0.04 | 0.04 | 0.04 |
| $C_4H_{10}$ | 0.01 | 0.01 | 0.01 | 0.01 |
| $C_5$+ in ppm | 100 | 520 | 390 | 380 |

EXAMPLE 2

Selective Hydrogenation of an Olefinic $C_3$ Cut
Operating Conditions

| First reactor | | Second reactor | |
|---|---|---|---|
| P | : 14 bars | P | : 27 bars |
| VVH fresh charge | 40 | VVH | : 50 |
| m | : 1.2 | m | : 2 |
| T | : 10°C | T | : 13°C |
| Recycling rate | : 3 | Recycling rate | : 0 |
| Catalyst | : $K_1$ | Catalyst | : $K_2$ |

| Hydro Carbon | Charge molar % | Intermediate product molar % | Product (molar %) |
|---|---|---|---|
| $C_2H_4$ | 0.05 | 0.05 | 0.05 |
| $C_3H_6$ | 89.21 | 95.73 | 95.44 |
| $C_3H_8$ | 2.33 | 3.38 | 4.13 |
| $CH_2=C=CH_2$ | 3.15 | 0.25 | 0.0020 (20ppm) |
| $CH \equiv C-CH_3$ | 4.88 | 0.21 | 0.0010 (10ppm) |
| $C_4H_8$ | 0.08 | 0.08 | 0.09 |
| $C_4H_{10}$ | 0.30 | 0.30 | 0.29 |
| $C_5+$ (ppm) | 25 | 395 | 425 |

It can be seen that even with very high initial contents of highly unsaturated compounds, there is obtained a good purity of the product without noticeable loss of propylene.

EXAMPLE 3

Selective Purification of an Olefinic $C_4$ Cut
Operating Conditions

| First reactor | | Second reactor | |
|---|---|---|---|
| P | : 9 bars | P | : 23 bars |
| T inlet | : 11°C | T | : 13°C |
| VVH fresh charge | : 70 | VVH | : 30 |
| m | : 1.3 | m | : 2 |
| Recycling rate | : 1 | Recycling rate | : 0 |
| Catalyst | : $K_1$ | Catalyst | : $K_2$ |

| Hydrocarbons | Fresh charge | Product |
|---|---|---|
| $C_3H_8 + C_3H_6$ | 0.01 | 0.01 |
| $iC_4H_{10}$ | 1.19 | 1.19 |
| $nC_4H_{10}$ | 8.29 | 10.12 |
| $1C_4H_8$ | 25.98 | 25.83 |
| iso $C_4H_8$ | 41.55 | 41.50 |
| 2 trans $C_4H_8$ | 11.43 | 12.01 |
| 2 cis $C_4H_8$ | 7.60 | 7.99 |
| $1-3\ C_4H_6$ | 2.77 | 0.0030 |
| $1-2\ C_4H_6$ | 0.02 | null |
| $CH \equiv C-CH_3$ | 0.20 | null |
| $CH \equiv C-CH_2-CH_3$ | 0.04 | null |
| $CH \equiv C-CH=CH_2$ | 0.06 | null |
| $CH \equiv C-C \equiv CH$ | 0.0010 | null |
| $C_5^+$ | 0.86 | 1.39 |

With a $C_4$ cut from which butadiene must be also removed the performances of the process such as described in the invention are still excellent; in this particular case, there is observed an increase in the butenes content with respect to the initial content.

EXAMPLE 4

Selective Purification of a Butadiene Cut
Operating Conditions

| First reactor | | Second reactor | |
|---|---|---|---|
| P | : 9 bars | P | : 28 bars |
| T inlet | : 10°C | T | : 10°C |
| VVH fresh charge | : 40 | VVH | : 20 |
| m | : 2 | m | : 4 |
| Recycling rate | : 0 | Recycling rate | : 0 |
| Catalyst | : $K_1$ | Catalysts | : 50% $K_2$ : 50% $K_3$ |

| Hydrocarbon | Fresh charge (molar %) | Intermediate product (molar %) | Product (molar %) |
|---|---|---|---|
| $C_3H_8$ | 0.012 | 0.01 | 0.010 |
| $iC_4H_{10}$ | 0.47 | 0.50 | 0.52 |
| $nC_4H_{10}$ | 2.55 | 2.60 | 2.85 |
| $1C_4H_8$ | 13.77 | 14.80 | 14.80 |
| iso $C_4H_8$ | 26.82 | 26.80 | 26.83 |
| 2 trans$C_4H_8$ | 6.23 | 6.71 | 6.77 |
| 2 cis $C_4H_8$ | 4.73 | 4.88 | 5.10 |
| $1-3C_4H_6$ | 44.61 | 43.55 | 42.89 |
| $1-2\ C_4H_6$ | 0.20 | 0.14 | 0.12 |
| $CH \equiv C-CH_3$ | 0.08 | 0.01 | 0.004 |
| $CH \equiv C-CH_2-CH_3$ | 0.103 | 0.024 | 0.011 |
| $CH \equiv C-CH=CH_2$ | 0.425 | 0.02 | 0.002 |

With a charge where the desired product is butadiene, the obtained selectivities are not so good since the ratio $(K_i b_i / K_B b_B)$ is not so high than the ratios $(K_i b_i / K_O b_O)$ corresponding to the preceding examples; $K_i$, $K_B$, $K_O$, $b_i$, $b_B$, $b_O$ being the velocities constants (K) and the adsorption coefficients (b) of impurities (i), of butadiene (B) and of olefines (O); the conversion rate of vinyl acetylene is close to 99.55 percent for a butadiene loss lower than 4 percent.

EXAMPLE 5

Selective Hydrogenation of a Pyrolysis Gasoline
Composition of the Charge

| | |
|---|---|
| Paraffins | : vol. % 28 |
| Monoolefins | : vol. % 22.5 |
| Diolefins | : vol. % 6.8 |
| non olefinic aromatics | : vol % 40.5 |
| alkenyl aromatics | : vol. % 2.2 |

Characteristic Features of the Charge

| | | |
|---|---|---|
| ASTM distillation | Initial point (°C) | 41 |
| | Final point | 178 |
| Specific gravity | : | 0.765 |
| S total (ppm) | : | 170 |
| S acid (ppm) | : | 5 |

Characteristic Features of the Hydrogenating Gas

| | | |
|---|---|---|
| $H_2$ | : vol. % | 84.00 |
| $CH_4$ | : | 14.80 |
| $C_2H_6$ | : | 1.2 |

Operating Conditions

| First reactor | | Second reactor | |
|---|---|---|---|
| T inlet | : 60°C | | 60°C |
| P | : 28 bars | | 40 bars |
| $H_2$/dienes+alkenyl | : 4 | | 10 |
| Catalyst | : $K_1$ | | $K_1$ |
| Recycling rate | : 1 | | 0 |
| Spatial velocity | : 12 | | 6 |

Comparison of the Charge with the Product

| | Feed | Product |
|---|---|---|
| Bromine number g $Br_2$/100 g | 80 | 60 |
| Maleic anhydride value mg M.A./g | 61 | <1 |
| Clear research octane number | 94 | 93 |
| Ethyl research octane number | 99 | 99 |
| Existing gums mg/100ml | 2 | 5 |
| Potential gums mg/100ml | >2000 | 5 |
| Induction period (10 ppm of inhibitor) | <200 | >960 |

The various measurements indicated are carried out according to the well known ASTM methods, the maleic anhydride value is measured according to the UOP standard (UOP method 326.58). It is apparent that by the treatment carried out herein, there is obtained a stable gasoline without loss in octane number for products ethylated at 5/1 000.

We claim:

1. A process for purification, by selective hydrogenation, of a mixture of hydrocarbons of three to 10 carbon atoms, said mixture containing at least one monoolefin, and as an impurity to be selectively hydrogenated, a highly unsaturated compound selected from the group consisting of acetylenic, diolefinic, and alkenylaromatic compounds, said process comprising passing said hydrocarbon mixture in the liquid phase together with a hydrogenation gas into a first stage reaction zone containing a fixed bed Group VIII metal hydrogenation catalyst, conducting said first stage reaction at a temperature of from −10° to 180°C, under a sufficient pressure and for a sufficient time both to partially hydrogenate said impurity and to vaporize from 5 to 50 percent by weight of the hydrocarbon mixture within said first zone, thereby avoiding a high temperature increase of the reaction medium due to exothermal reaction heat;

condensing resultant vaporized fraction; and
passing resulting hydrocarbon mixture from the first reaction zone, in the liquid phase, together with a hydrogenation gas into a second stage reaction zone, containing a fixed bed Group VIII metal hydrogenation catalyst, conducting said second stage reaction at a temperature of from 0° to 120°C and under a higher pressure than in the first stage and for a sufficient time to further hydrogenate said impurity and to hydrogenate up to a partial amount of said monoolefin, which pressure is sufficient for maintaining substantially all the reactants in the liquid phase during the hydrogenation in said second stage.

2. A process according to claim 1, further comprising recycling a portion of the hydrocarbon mixture condensed after the first stage reaction zone back into the inlet of said first zone.

3. A process according to claim 1, wherein the hydrocarbon mixture passing into the second reaction zone contains less than 5,000 ppm of highly unsaturated compounds by weight.

4. A process according to claim 1, wherein the temperature difference between the inlet and the outlet of the first reaction zone is maintained lower than 20°C.

5. A process according to claim 1, wherein the hydrocarbon mixture introduced in the first reaction zone has a content of highly unsaturated compounds of from 0.5 to 3 percent.

6. A process according to claim 1, wherein the pressure in the first reaction zone is in the range of from 5 to 50 bars.

7. A process according to claim 1, wherein the pressure in the second reaction zone is in the range of from 15 to 80 bars.

8. A process according to claim 1, wherein the feed charge is a $C_3$ cut and the hydrogenation temperature is −10° to 50°C in the first stage and 0° to 30°C in the second stage.

9. A process according to claim 1, wherein the feed charge is a $C_4$ cut and the hydrogenation temperature is −10° to 50°C in the first stage and 0° to 30°C in the second stage.

10. A process according to claim 1, wherein the feed charge is pyrolysis gasoline, consisting essentially of hydrocarbons having from five to 10 carbon atoms per molecule and wherein the hydrogenation temperature is from 20° to 180°C in both zones.

11. A process according to claim 1 wherein the Group VIII metal is nickel.

12. A process according to claim 1 wherein the Group VIII metal is palladium.

13. A process according to claim 1 wherein the temperature difference between the inlet and the outlet of the first reaction zone is maintained lower than 10°C.

14. A process as defined by claim 8 wherein the temperature in the second stage is 10° to 20°C.

15. A process asddefined by claim 9 wherein the temperature in the second stage is 10° to 20°C.

16. A process according to claim 1 wherein the hydrocarbon mixture introduced in the first reaction zone has a content of highly unsaturated compounds of from 1 to 2 percent.

17. A process for purification by selective hydrogenation, of a mixture of hydrocarbons of three to 10 carbon atoms, said mixture containing at least one monoolefin, and as an impurity to be selectively hydrogenated, a highly unsaturated compound selected from the group consisting of acetylenic, diolefinic, and alkenylaromatic compounds, said process comprising passing said hydrocarbon mixture in the liquid phase together with a hydrogenation gas into a first stage reaction zone containing a fixed bed Group VIII metal hydrogenation catalyst, conducting said first stage reaction at a temperature of from −10° to 180°C for a sufficient time to partially hydrogenate said impurity and controlling the pressure in said first stage reaction zone to vaporize from 5 to 50 percent by weight of the hydrocarbon mixture within said first stage reaction zone during said time, thereby avoiding a high temperature increase of the reaction medium due to exothermal reaction heat;

withdrawing from said first stage reaction zone a reaction mixture comprising both the vaporized and the unvaporized fraction of the hydrocarbon mixture, condensing the vaporized fraction of said mixture, and admixing it with the unvaporized fraction thereof, so as to recover the total outflow from the first stage reaction zone as an essentially liquid phase, and passing said essentially liquid phase, together with a hydrogenation gas into a second stage reaction zone, containing a fixed bed Group VIII metal hydrogenation catalyst, conducting said second stage reaction at a temperature of from 0° to 120°C and under a higher pressure than in the first stage and for a sufficient time to further hydrogenate said impurity and to hydrogenate up to a partial amount of said monoolefin, which pressure is sufficient for maintaining substantially all the reactants in the liquid phase during the hydrogenation in said second stage.

18. A process for purification, by selective hydrogenation of a butadiene cut, said cut containing a predominant amount of 1,3-butadiene, and as an impurity to be selectively hydrogenated, at least one member selected from the group consisting of 1,2-polybutadiene and an acetylenic compound of three to four carbon atoms, said process comprising passing said butadiene cut in the liquid phase together with a hydrogenation gas into a first stage reaction zone containing a fixed bed Group VIII metal hydrogenation catalyst, conducting said first stage reaction at a temperature of from −10° to 180°C under a sufficient pressure and for a sufficient time both to partially hydrogenate said impurities and to vaporize from 5 to 50 percent by weight of the butadiene cut within said first stage reaction zone, thereby avoiding a high temperature increase of the reaction medium due to exothermal reaction heat;

condensing resultant vaporized fraction; and passing resultant total butadiene cut from the first reaction zone, in the liquid phase, together with a hydrogenation gas into a second stage reaction zone, containing a fixed bed Group VIII metal hydrogenation catalyst;

conducting said second stage reaction at a temperature of from 0° to 120°C and under a higher pressure than in the first stage and for a sufficient time to further hydrogenate said impurity, which pressure is sufficient for maintaining substantially all the reactants in the liquid phase during the hydrogenation in said second stage.

19. A process as defined by claim 1 wherein said mixture of hydrocarbon is a propylene cut.

20. A process as defined by claim 1 wherein said mixture of hydrocarbon is a butene cut.

* * * * *